(12) United States Patent
Song et al.

(10) Patent No.: US 12,260,485 B2
(45) Date of Patent: Mar. 25, 2025

(54) CASCADED DOMAIN BRIDGING FOR IMAGE GENERATION

(71) Applicant: Lemon Inc., Grand Cayman (KY)

(72) Inventors: Guoxian Song, Los Angeles, CA (US); Shen Sang, Los Angeles, CA (US); Tiancheng Zhi, Los Angeles, CA (US); Jing Liu, Los Angeles, CA (US); Linjie Luo, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 176 days.

(21) Appl. No.: 18/046,077

(22) Filed: Oct. 12, 2022

(65) Prior Publication Data

US 2024/0135627 A1    Apr. 25, 2024

(51) Int. Cl.
*G06T 15/00* (2011.01)
*G06T 7/11* (2017.01)
*G06T 15/02* (2011.01)

(52) U.S. Cl.
CPC ............... *G06T 15/02* (2013.01); *G06T 7/11* (2017.01); *G06T 2207/20081* (2013.01); *G06T 2207/20084* (2013.01); *G06T 2207/30201* (2013.01)

(58) Field of Classification Search
CPC ......... G06T 19/00; G06T 17/20; G06T 17/00; G06T 15/10; G06T 15/00; G06T 13/40; G06T 15/06; G06T 15/08; G06T 15/20; G06T 15/04; G06T 2210/41; G06T 15/005; G06T 1/20; G06T 19/006; G06T 7/337; G06T 7/50; G06T 7/74; G06T 19/20; G06T 2200/04; G06T 2207/10016; G06T 2207/30244; G06T 2219/024; G06T 2219/2016; G06T 2210/12; G06T 2210/21; G06T 7/70; G06T 2207/20084; G06F 16/51; G06F 21/602; H04N 23/64; H04N 23/90; G06V 20/20
USPC ........................................................ 345/419
See application file for complete search history.

(56) References Cited

U.S. PATENT DOCUMENTS

| | | | |
|---|---|---|---|
| 2019/0295302 A1* | 9/2019 | Fu | G06T 11/00 |
| 2021/0280322 A1 | 9/2021 | Frank | |
| 2021/0358164 A1* | 11/2021 | Liu | G06N 3/088 |
| 2021/0406682 A1* | 12/2021 | Meeyakhan Rawther | G06F 17/18 |
| 2023/0130535 A1 | 4/2023 | Ma | |
| 2023/0316606 A1* | 10/2023 | Qu | G06N 3/0464 345/619 |

OTHER PUBLICATIONS

Office Action dated Jun. 5, 2024 in U.S. Appl. No. 18/046,073 (39 pages).

* cited by examiner

*Primary Examiner* — Gordon G Liu

(57) ABSTRACT

A method of generating a style image is described. The method includes receiving an input image of a subject. The method further includes encoding the input image using a first encoder of a generative adversarial network (GAN) to obtain a first latent code. The method further includes decoding the first latent code using a first decoder of the GAN to obtain a normalized style image of the subject, wherein the GAN is trained using a loss function according to semantic regions of the input image and the normalized style image.

20 Claims, 11 Drawing Sheets

CASCADED DOMAIN BRIDGING FOR IMAGE GENERATION

BACKGROUND

Avatar images are commonly used to represent a user within a social media context, gaming world, or other digital representation. Generally, the digital representations of different users follow one or more aesthetic styles that have been created, for example, based on a target domain of stock assets that may be combined into a representation of a user's face. In some scenarios, a user creates the avatar image using the stock assets, for example, by manually selecting a hair style, a hair color, a facial hair style, a mouth shape, etc. from among the stock assets. However, creating an avatar manually usually involves laborious selections and adjustments from a swarm of art assets, which is both time-consuming and difficult for average users with little prior experience.

Portrait stylization techniques may be used to transform images from the user (e.g., selfies) into stylized images that are close to the target domain. An agile generative adversarial network (AgileGAN) framework may be used to generate stylized images from an input image, but an AgileGAN framework generally keeps various characteristics of the stylized image consistent with those of the input image, such as keeping a same pose, facial expression, lighting, etc. These characteristics complicate further use of assets within a target domain, such as when generating different expressions, animations, etc.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure are directed to improving image quality of generated images.

In some examples, a method of generating a style image is provided. The method includes receiving an input image of a subject. The method further includes encoding the input image using a first encoder of a generative adversarial network (GAN) to obtain a first latent code. The method further includes decoding the first latent code using a first decoder of the GAN to obtain a normalized style image of the subject, wherein the GAN is trained using a loss function according to semantic regions of the input image and the normalized style image.

In some examples, the method further includes training the GAN by inverting a dataset of real face images to obtain a plurality of latent codes that model a distribution prior of a W+ space for the dataset.

In some examples, the method further includes inverting the dataset of real face images using a second encoder that is pre-trained and different from the first decoder to obtain the plurality of latent codes.

In some examples, the second encoder is a pre-trained StyleGAN encoder.

In some examples, training the GAN further comprises performing a W+ space transfer learning from the second encoder to the first encoder.

In some examples, performing the W+ space transfer learning comprises using a normalized exemplar set with only neutral expressions of the subject.

In some examples, performing the W+ space transfer learning comprises using a normalized exemplar set with only neutral poses of the subject.

In some examples, performing the W+ space transfer learning comprises using a normalized exemplar set with only neutral lighting of the subject.

In some examples, the method further includes training the GAN using a difference between a first face segmentation model trained using real face images and a second face segmentation model using style exemplars as the loss function.

In some examples, the semantic regions include one or more of hair regions of the subject or skin regions of the subject.

In some examples, a system for generating a style image is provided. The system includes a processor, and memory storing instructions that, when executed by the processor, cause the system to perform a set of operations. The set of operations includes one or more aspects described above.

In some examples, a non-transient computer-readable storage medium includes instructions that are executable, by one or more processors, to cause the one or more processors to implement one or more aspects described above.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS/FIGURES

Non-limiting and non-exhaustive examples are described with reference to the following Figures.

DETAILED DESCRIPTION

Figure 1:
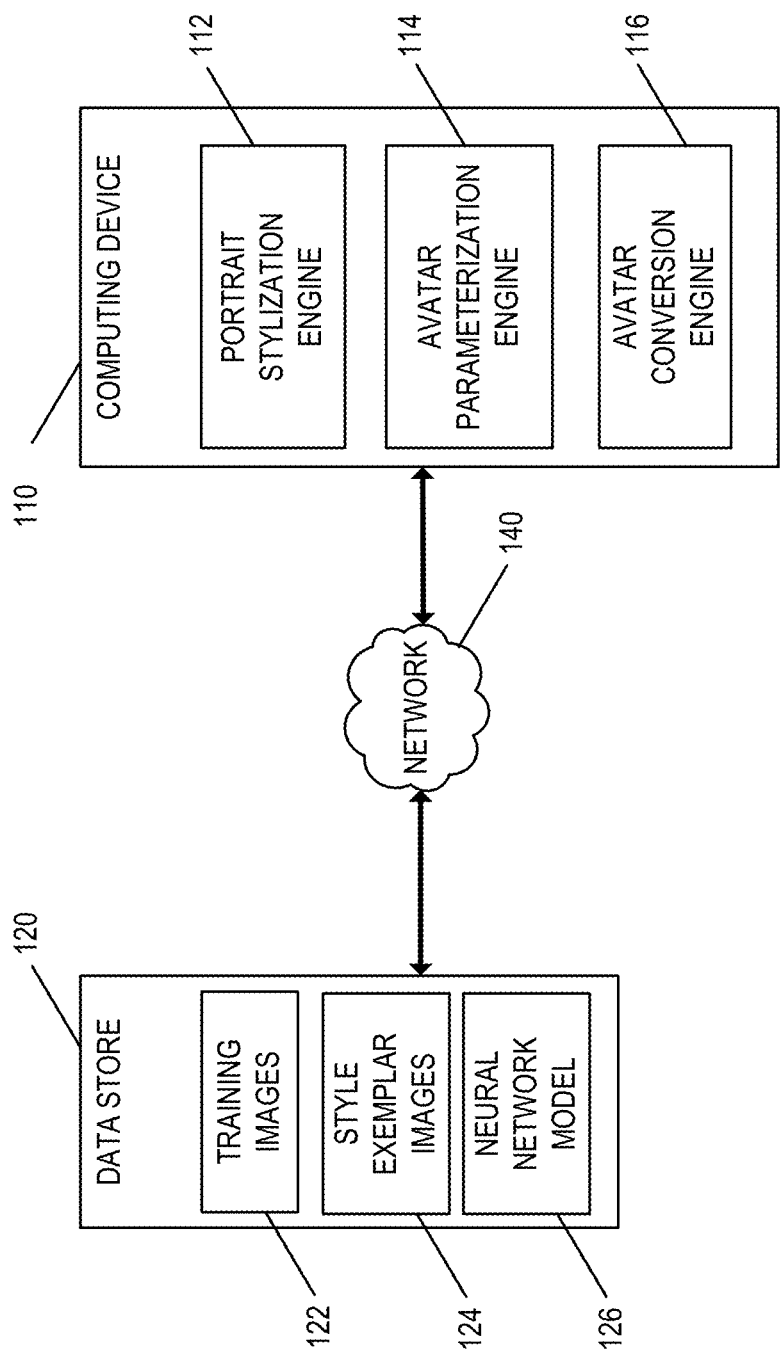
FIG. 1 shows a block diagram of an example of an image stylization system, according to an example embodiment.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Stylized 3D avatars have become increasingly prominent in our modern life. Creating 3D avatars manually usually involves laborious selection and adjustment of continuous and discrete parameters, which can be inefficient to implement. For example, manual adjustment of continuous and discrete parameters to generate an avatar, and then visually evaluating a quality of the avatar, with respect to an image of a corresponding user for which the avatar was generated, can require a relatively large amount of time and computational resources (e.g., processing power and memory storage). Further, such a process can be frustrating and inefficient to implement.

Various improved portrait stylization techniques, according to mechanisms described herein, may be used to transform images from a user into applied style images that match a desired style and also one or more additional subject characteristics, such as pose, facial expression, and lighting. In some scenarios, a single input image from the user may be used to generate many different applied style images with different poses or facial expressions, for example. During portrait stylization, an image stylization system transforms an input image, such as a real user image or "selfie", into a normalized style image. Preferably, the normalized style image maintains as many personal identity features (e.g., glasses, hair style, facial features, etc.) from a subject of the input image as possible, while simultaneously normalizing a face of the subject within the normalized style image to look closer to a desired image style. The system then regresses a relaxed avatar vector from stylization latent code of the normalized style image via a suitable neural network or machine learning model, such as a multilayer perceptron (MLP) based mapper model. The system then performs an avatar conversion by discretizing part of the relaxed avatar vector to provide as input parameters of a graphics engine using an appearance-based search.

In some examples, supervised methods for avatar creation require for large scale data sets to be collected for facial attributes of an image for which facial attributes of an avatar may correspond. Classification or regression models may then be trained for facial attribute analysis to generate avatars based on the data sets of collected facial attributes for images. Some classification-based methods are inefficient because they require data collection, data annotation, and model training. In some examples, an avatar modeling system may have 10+ attributes including hair styles, brow types, facial hair types, mouth width, nose height, etc. Some methods will involve data collection, data annotation, and model training for each of the 10+ attributes. The overhead (e.g., processing power and memory required) for such methods is relatively high. In addition, the three stages mentioned above may be re-performed when there are any updates to the avatar system. For example, if a number of hair styles that a user may select from for a stylized image increases from 45 to 50, by adding new assets to a system, then data needs to be re-collected, annotated, and the corresponding models will need to be retrained.

Accordingly, given a single facial image of a user (e.g., a front-facing selfie image), there exists a need to automatically create a stylized 3D avatar, given a plurality of predefined assets (e.g., continuous and/or discrete parameters) and a corresponding rendering engine. In some examples, the stylized 3D avatar may be used for downstream applications, such as, for example, personalized emojis, animations, etc.

Mechanisms described herein provide a novel self-supervised learning framework to create high-quality stylized 3D avatars with a mix of continuous and discrete parameters. In some examples provided herein, a cascaded domain bridging framework leverages a modified portrait stylization approach, to translate input images of a user (e.g., selfies) into stylized avatar renderings as the targets for desired 3D avatars. Further, mechanisms described herein determine a plurality of parameters of the avatars, to match the stylized avatar renderings, through a differentiable imitator that is trained to mimic an avatar graphics engine. To effectively determine parameters, mechanisms described herein adopt a cascaded relaxation and search pipeline.

This and many further embodiments for a computing device are described herein. For instance, FIG. 1 shows a block diagram of an example of an image stylization system 100, according to an example embodiment. The system 100 includes a computing device 110 that is configured to generate applied style images. The system 100 may also include a data store 120 that is communicatively coupled with the computing device 110 via a network 140, in some examples.

The computing device 110 may be any type of computing device, including a smartphone, mobile computer or mobile computing device (e.g., a Microsoft® Surface® device, a laptop computer, a notebook computer, a tablet computer such as an Apple iPad™ a netbook, etc.), a stationary computing device such as a desktop computer or PC (personal computer), or a server computing device. The computing device 110 may be configured to communicate with a social media platform, cloud processing provider, software as a service provider, or other suitable entity, for example, using social media software and a suitable communication network. The computing device 110 may be configured to execute one or more software applications (or "applications") and/or services and/or manage hardware resources (e.g., processors, memory, etc.), which may be utilized by users of the computing device 110.

Computing device 110 comprises a portrait stylization engine or component 112, an avatar parameterization engine or component 114, and an avatar conversion engine or component 116. In the example shown in FIG. 1, the portrait stylization engine 112, the avatar parameterization engine 114, and the avatar conversion engine 116 are provided as separate elements within the computing device 110, but may be implemented as a single engine in other examples. Moreover, these engines may be distributed across different instances of the computing device 110, for example, with the portrait stylization engine 112 on a first computing device, the avatar parameterization engine 114 on a second computing device, and the avatar conversion engine 116 on a third computing device. In still other examples, any of the engines may be implemented across multiple computing devices, for example, as a distributed or cloud computing module.

Data store 120 may include one or more of any type of storage mechanism, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium. The data store 120 may store training images 122 for training neural network models, style exemplar images 124 for training network models, or neural network models 126 themselves, for example. In some examples, one or more data stores 120 may be co-located (e.g., housed in one or more nearby buildings with associated components such as backup power supplies, redundant data communications, environmental controls, etc.) to form a datacenter, or may be arranged in other manners. Accordingly, in an embodiment, one or more of data stores 120 may be a datacenter in a distributed collection of datacenters.

Network 140 may comprise one or more networks such as local area networks (LANs), wide area networks (WANs), enterprise networks, the Internet, etc., and may include one or more of wired and/or wireless portions. Computing device 110 and data store 120 may include at least one wired or wireless network interface that enables communication with each other (or an intermediate device, such as a Web server or database server) via network 140. Examples of such a network interface include but are not limited to an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, or a near field communication (NFC) interface. Examples of network 140 include a local area network (LAN), a wide area network (WAN), a personal area network (PAN), the Internet, and/or any combination thereof.

The portrait stylization engine 112 is configured to transform an input image, such as a real user image or "selfie", into a normalized style image. Generally, the normalized style image is an image that represents a subject of the input image, but rendered with a particular aesthetic style, such as a cartoon style, oil painting style, comic book style, or other suitable style. The normalized style image is "normalized" in that it is generated to have a neutral pose, expression, and illumination, which is more readily converted for use in generating images with different facial expressions, head poses, lighting, etc. with subsequent processing, described below.

The avatar parameterization engine or component 114 may include a model that regresses one or more avatar parameters from a stylized image. For example, the model may be a trained machine learning model that regresses one or more avatar parameters from a stylized image, via stylization latent code, received from a decoder that corresponds to the stylized image. Additionally, or alternatively, the trained model may include a multi-layer perceptron (MLP) mapper that maps stylized latent code to one or more avatar parameters (e.g., as may be configured for the avatar parameterization component 114). The trained model may be trained using a mapper loss or error which measures the similarity between a stylized image and an imitator output. The mapper loss or error may be based on a global similarity, local similarity, and/or color similarity between input images.

The one or more avatar parameters generated by the avatar parameterization component 114 may be a plurality of avatar parameters. The plurality of avatar parameters may include one or more continuous parameters. For example, the continuous parameters may include head characteristics, mouth characteristics, nose characteristics, ear characteristics, and/or eye characteristics, which each correspond to a user of whom an input image corresponds. Further, the continuous parameters may include continuous values corresponding to one or more from the group of: hair type, brow type, beard type, glasses type, eyelash type, eye makeup type, eye color type, brow color type, skin tone, hair color type, beard color type, mouth color type, and/or glasses color type.

In some examples, with respect to the continuous parameters, the head characteristics include a head width, a head length, and a blend shape coefficient for a head shape (e.g., a blend shape coefficient that corresponds to a circular head, an ovular head, etc.). In some examples, the mouth characteristics include a mouth width, a mouth volume, and a mouth position. In some examples, the nose characteristics include a nose width, a nose height, and a nose position. In some examples, the eye characteristics include an eye size, an eye spacing, and an eye rotation. Additionally, or alternatively, in some examples, the ear characteristics comprise an ear size. Each of the characteristics of the continuous parameters may include a continuous value.

The avatar conversion engine or component 116 converts one or more continuous values, from the plurality of avatar parameters generated by the avatar parameterization component 114, to one or more discrete parameters that are each defined by one or more discrete options. In some examples, the discrete parameters include one or more from the group of: hair type, brow type, beard type, glasses type, eyelash type, eye makeup type, eye color type, brow color type, skin tone, hair color type, beard color type, mouth color type, and/or glasses color type. Each of the discrete parameters may have a discrete number of choices to which the respective discrete parameter corresponds. For example, the eye color type may have associated discrete options such as: gray, green, hazel, blue and/or brown. As another example, glasses color type may include options such as: red, orange, yellow, green, blue, indigo, and/or violet. Additional and/or alternative discrete options which may correspond to a respective discrete parameters of the discrete parameters should be recognized by those of ordinary skill in the art.

A graphics engine may require discrete selections for attributes such as hair style and glasses type (e.g., a selection of a discrete option corresponding to a respective discrete parameter). However, in some examples, a mapper module in the avatar parameterization component 114 may only generate continuous values. In some instances, discretization can be performed by picking a discrete option, based on a corresponding continuous value, with the highest probability, given a softmax result. However, such an approach may not achieve quality results for generating a corresponding avatar, such as in instances with multi-class attributes (e.g., 45 hair types). In such instances, a solution space may be under-constrained. For example, medium length hair may be achieved by selecting medium length hair type, or by mixing between short and long hair types. In the latter instance, simply selecting the highest probability of short or long hair may not be optimal for generating a quality avatar.

Figure 2A:
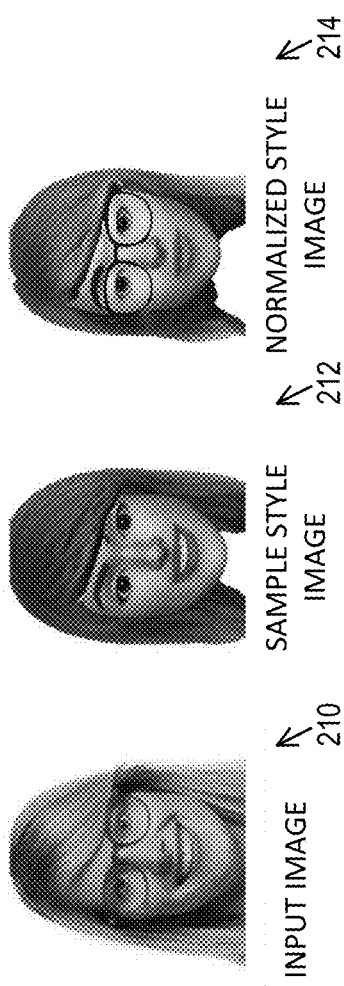
FIG. 2A shows example diagrams of input images for stylization, sample style images that represent the input images, and normalized style images from an image stylization system, according to an example embodiment.

FIG. 2A shows example diagrams of input images for stylization, sample style images that represent the input images, and normalized style images from an image stylization system, according to an example embodiment. Generally, an input image 210 may be provided to the image stylization system 100. In the example shown in FIG. 2A, the input image 210 portrays a female subject who is smiling, with blonde hair, and glasses. A typical stylization technique, for example, using a StyleGAN-based model or other suitable model, may generate a sample style image 212 as an avatar image representing the subject. However, the sample style image 212 omits the glasses of the subject and so does not fully depict relevant personal identity features of the subject. Moreover, the sample style image 212 maintains the smiling expression of the subject, which may complicate the generation of similar avatar images for the subject that have a different expression (e.g., a shouting or crying expression). The example input image 210 was created by Sebastiaan ter Burg, has an attribution license, and was obtained from https://www.flickr.com/photos/ter-burg/38795485652.

The image stylization engine 100 is configured to generate the normalized style image 214, with improved capture of the personal identity features of the subject and also a more neutral expression, pose, and lighting. More specifically, the portrait stylization engine 112 is configured to use an encoder-decoder framework with a normalized style exemplar set and suitable loss functions for the neutral expression, pose, and lighting, described below.

Figure 2B:
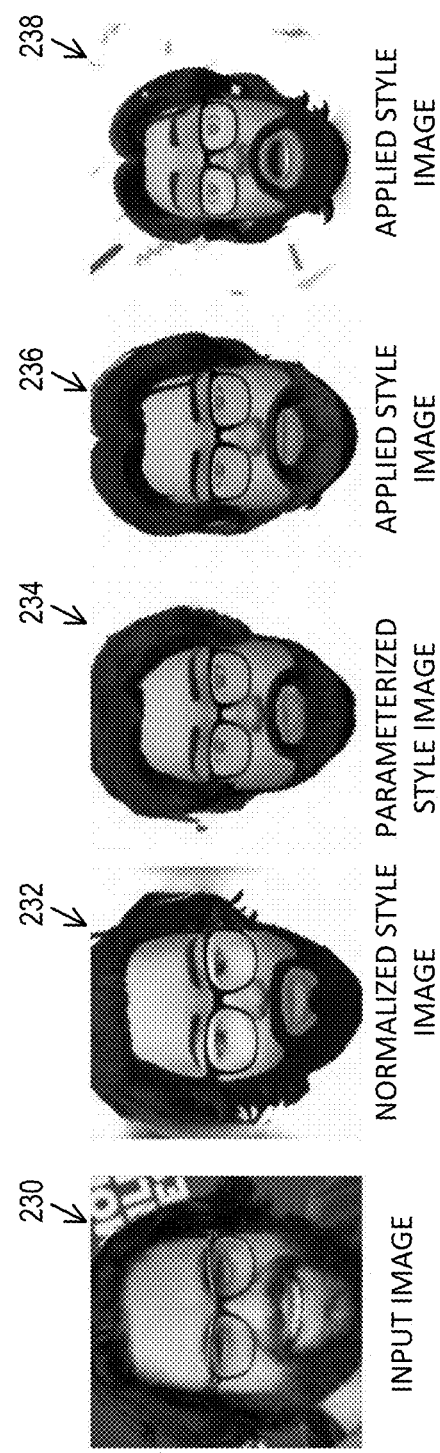
FIG. 2B shows example diagrams of an input image for stylization, a sample style image that represents the input image, a normalized style image from an image stylization system, a parameterized style image from the image stylization system, and an applied style image based on the parameterized style image, according to an example embodiment.

FIG. 2B shows an example diagrams of an input image 230 for stylization, a normalized style image 232 from an image stylization system, a parameterized style image 234 from the image stylization system, and applied style images 236 and 238 based on the parameterized style image 234, according to an example embodiment. The input image 230 may be provided by a user, for example, as a selfie for generation of an avatar image (or avatar animation) that represents a subject of the input image 230. The portrait stylization engine 112 may generate the normalized style image 232 based on the input image 230. The avatar parameterization engine 114 may generate the parameterized style image 234 based on the normalized style image 232. The avatar conversion engine 116 may generate the applied style images 236 or 238 based on the parameterized style image 234. The example input image 230 was created by Montclair Film, has an attribution license, and was obtained from https://www.flickr.com/photos/montclair-filmfest/34244383481.

Figure 3:
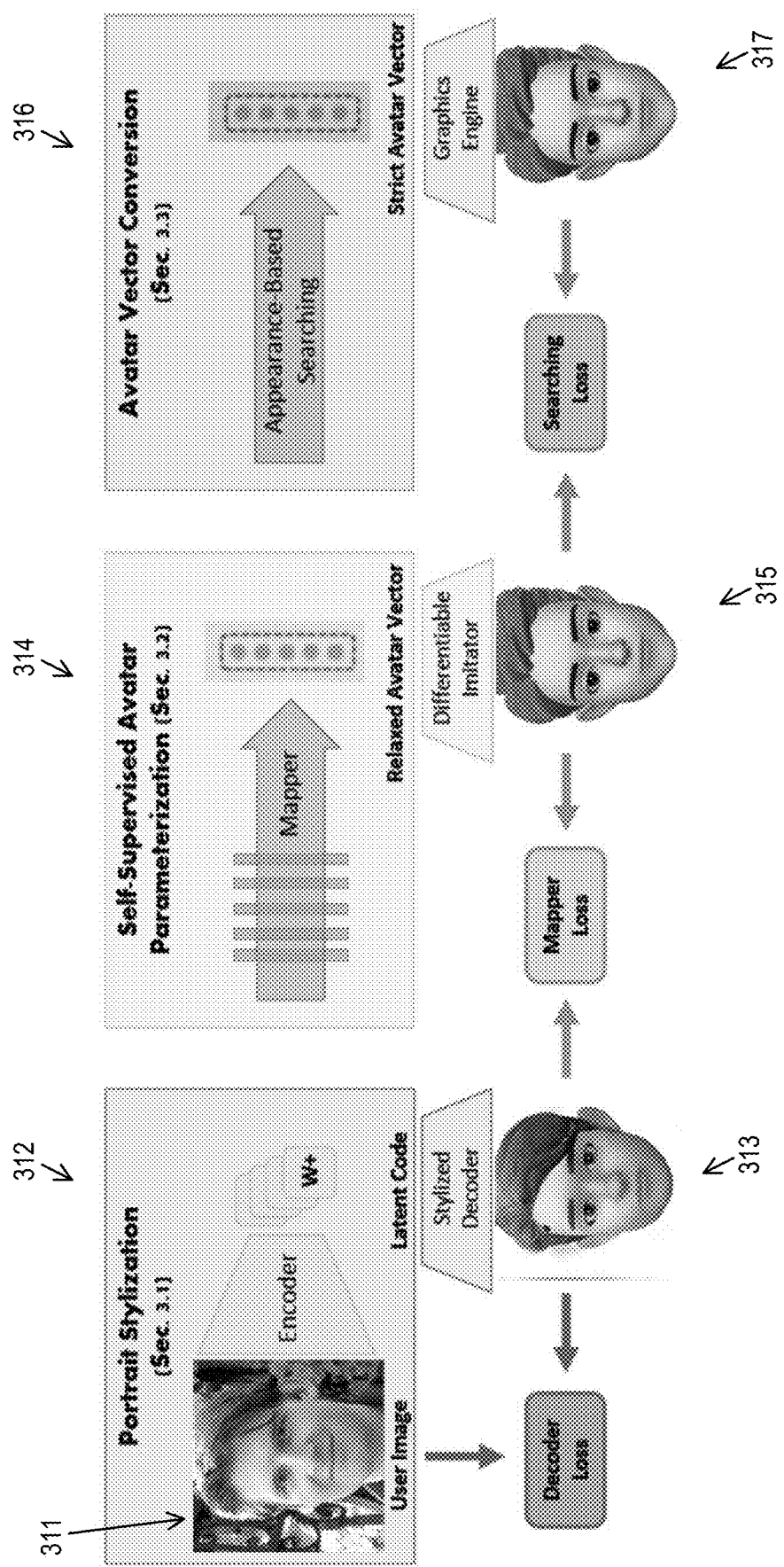
FIG. 3 shows a diagram of an example process flow for generating an applied style image, according to an example embodiment.

FIG. 3 shows a diagram of an example process flow 300 for generating an applied style image, according to an example embodiment. In some examples, the image stylization engine 100 is configured to generate normalized style images for input images. Generally, an input image 311 is a real image that has a subject, such as a user, pet, an object, or other suitable subject. A real image may be a selfie or other image captured with a suitable image sensor, such as an image sensor in a smartphone, digital camera, etc. Generally, the real image is not processed in a way that distorts a natural appearance of the subject, for example, by changing geometry of the subject's appearance or extensive changes to colors, applying filters, etc. The example input image 311 was created by Adam Marek, has an attribution license, and was obtained from https://www.flickr.com/photos/litfest/4796332160/.

The process flow 300 shows portions of a portrait stylization engine or component 312, an avatar parameterization engine or component 314, and an avatar conversion engine or component 316, which generally correspond to the portrait stylization engine 112, the avatar parameterization engine 114, and the avatar conversion engine 116, respectively. The portrait stylization engine 312 is configured to receive the input image 311 and transform the input image into a normalized style image 313, having a desired aesthetic style. The desired aesthetic style may be based upon style exemplar images, such as style exemplar images 124, where a neural network model (e.g., neural network model 126) is trained using the style exemplar images 124 to convert real images into suitable normalized style images.

The avatar parameterization engine or component 314 may be configured to receive the stylized image 313 and generate an avatar image 315. Generally, the avatar parameterization component is configured to cross from an image pixel domain to an avatar vector domain. Mechanisms described herein use a relaxed formulation called a relaxed avatar vector in which discrete parameters may be encoded as continuous one-hot vectors. To enable differentiability in training, an imitator may be trained to mimic the behavior of a non-differentiable graphics engine.

In some examples, the avatar parameterization component 314 includes a model that regresses one or more avatar parameters from a stylized image. For example, the model may be a trained machine learning model that regresses one or more avatar parameters from a stylized image, via stylization latent code, received from a decoder that corresponds to the stylized image. Additionally, or alternatively, the trained model may include a multi-layer perceptron (MLP) mapper that maps stylized latent code to one or more avatar parameters (e.g., as may be configured for the avatar parameterization component 314). The trained model may be trained using a mapper loss or error which measures the similarity between a stylized image and a differentiable imitator output. The mapper loss or error may be based on a global similarity, local similarity, and/or color similarity between input images.

The avatar conversion component 316 may receive the avatar image 315 and generate a final avatar 317. Generally, the avatar conversion component 316 is configured to cross from a relaxed avatar vector space to a strict avatar vector space in which all discrete parameters are one-hot vectors. Strict avatar vectors can then be used by a graphics engine to create final avatars and/or for rendering. Mechanisms provided herein may include a novel search process that leads to higher quality final avatar results than direct quantization.

The avatar conversion engine or component 316 can convert one or more continuous values, generated by the avatar parameterization component 314, to one or more discrete parameters that are each defined by one or more discrete options. In some examples, the discrete parameters include one or more from the group of: hair type, brow type, beard type, glasses type, eyelash type, eye makeup type, eye color type, brow color type, skin tone, hair color type, beard color type, mouth color type, and/or glasses color type. Each of the discrete parameters may have a discrete number of choices to which the respective discrete parameter corresponds. For example, the eye color type may have associated discrete options such as: gray, green, hazel, blue and/or brown. As another example, glasses color type may include options such as: red, orange, yellow, green, blue, indigo, and/or violet. Additional and/or alternative discrete options which may correspond to a respective discrete parameters of the discrete parameters should be recognized by those of ordinary skill in the art.

A graphics engine may require discrete selections for attributes such as hair style and glasses type (e.g., a selection of a discrete option corresponding to a respective discrete parameter). However, in some examples, a mapper module in the avatar parameterization component 314 may only generate continuous values. In some instances, discretization can be performed by picking a discrete option, based on a corresponding continuous value, with the highest probability, given a softmax result. However, such an approach may not achieve quality results for generating a corresponding avatar, such as in instances with multi-class attributes (e.g., 45 hair types). In such instances, a solution space may be under-constrained. For example, medium length hair may be achieved by selecting medium length hair type, or by mixing between short and long hair types. In the latter instance, simply selecting the highest probability of short or long hair may not be optimal for generating a quality avatar.

Figure 4:
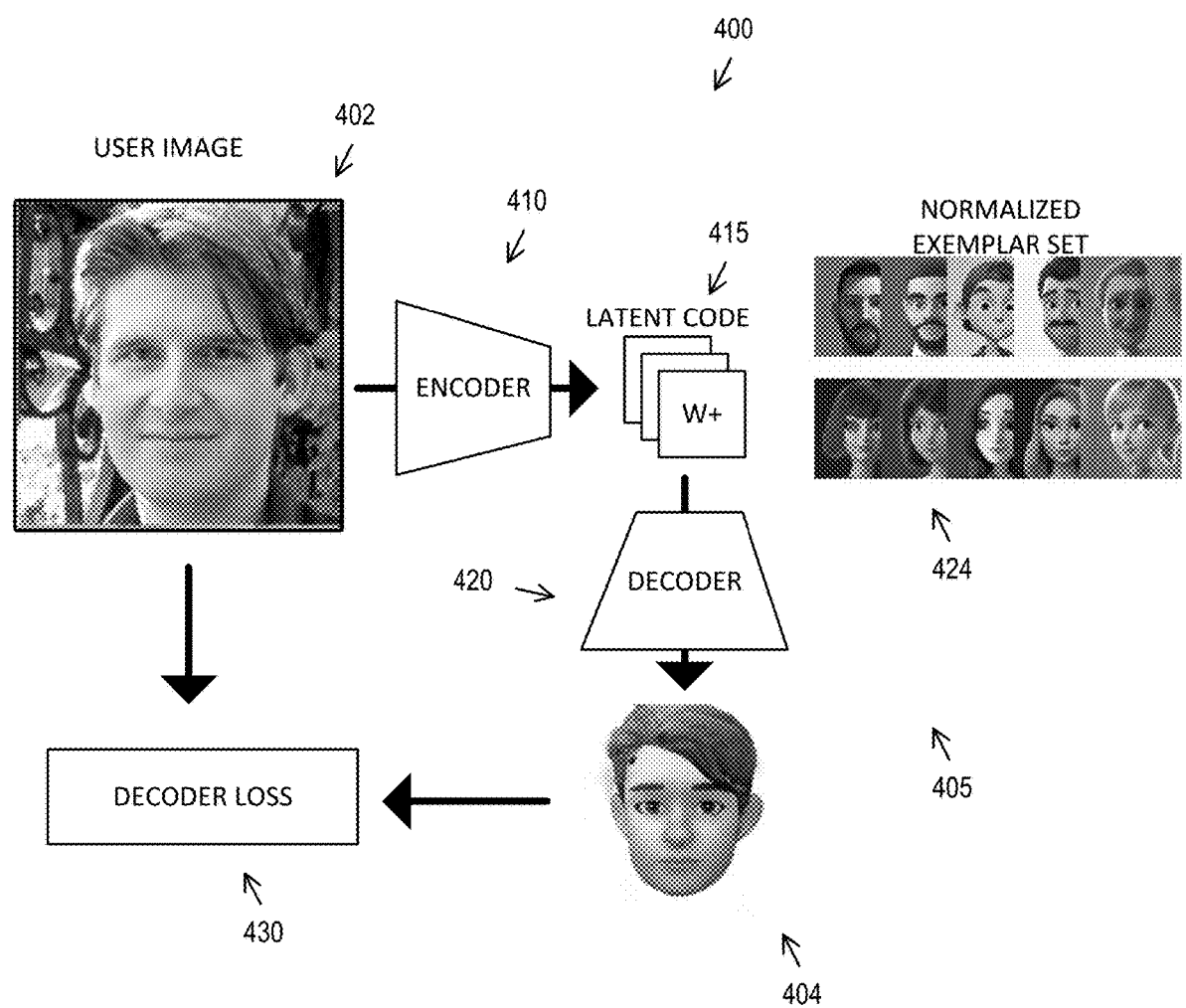
FIG. 4 shows a diagram of an example process flow for generating a normalized style image, according to an example embodiment.

FIG. 4 shows a diagram of an example process flow 400 for generating a normalized style image 404, according to an example embodiment. The process flow 400 may be performed, at least in part, by the portrait stylization engine 112. For portrait stylization, in various embodiments described herein, the portrait stylization engine 112 is configured to use a transfer learning approach including W+ space transfer learning processing, using a normalized style exemplar set 424, and a suitable loss function 430 that supports these modifications. The portrait stylization engine 112 reduces an effect of a pose and/or expression of an input image 402 when generating an output image, specifically, the normalized style image 404. In other words, instead of existing stylization methods that generally preserve source to target similarities literally by transferring specific facial expressions, head poses, and lighting conditions directly from input images (e.g., selfies) into target stylized images, the portrait stylization engine 112 described herein extracts core personal identity features to obtain normalized style images having neutral poses, expressions, and illumination. The normalized style images are then more readily converted for use in generating images with different facial expressions, head poses, lighting, etc., such as the applied style images 236 or 238.

In some examples, the portrait stylization engine 112 comprises a generative adversarial network (GAN) model 405 having an encoder 410 and a decoder 420. The encoder is configured to receive the input image 402 and generate a latent code (e.g., of a plurality of latent codes 415) that represents the input image. The decoder 420, which may also be referred to as a generator, generates a normalized style image 404 based on the latent code from the encoder 410. In some examples, the GAN model 405 is an Agile-GAN model. A starting baseline for training the decoder 420 includes using a pre-trained GAN model (e.g., StyleGAN-based model and/or StyleGAN2 model). The pre-trained GAN model (e.g., StyleGAN-based model and/or StyleGAN2 model) exhibits the property that if random samples from a Gaussian distribution in the Z latent space are acquired, the model can generate images fitting the original training distribution, for example, the original training distribution of the dataset. Training the AgileGAN model may include two stages. The task of training involves using an image as input; therefore, a corresponding latent vector for the GAN model (e.g., StyleGAN-based model and/or StyleGAN2 model) is determined. A front-end encoder is trained to map input images (e.g., training images 122) to latent spaces while keeping a back-end GAN generator (e.g., encoder 410) fixed. In a second process, starting from a copy of the pre-trained GAN model (e.g., StyleGAN-based model and/or StyleGAN2 model), the pre-trained GAN model (e.g., StyleGAN-based model and/or StyleGAN2 model) is fine-tuned such that a sample from a Gaussian distribution in the latent space can generate images that better fit a set of stylistic exemplars, such as the normalized exemplar set 424.

Generally, the normalized exemplar set comprises stylized images (e.g., rendered with a particular aesthetic style, such as a cartoon style, oil painting style, comic book style, or other suitable style) that are normalized in that they have a neutral facial expression and/or pose for a subject of the image and neutral lighting on the subject (e.g., a diffuse style lighting instead of a spotlight style of lighting). Stylized images with specific facial expressions (e.g., smiling, frowning, etc.), poses (e.g., with a head directed away from the image sensor), or lighting (e.g., with a bright light illuminating the subject from one side) are omitted from the normalized exemplar set 424 so that these image characteristics from an input image are generally ignored. Using the normalized exemplar set 424 trains the portrait stylization engine 112 to generate normalized style images that are more readily converted for use in generating images with different facial expressions, head poses, lighting, etc. with subsequent processing.

The portrait stylization engine 112 performs transfer learning directly from the W+ space, unlike previous AgileGAN methods where stylization transfer learning is done in a more entangled Z or Z+ space. Since the W+ space is more disentangled, it allows for preservation of more personal identity features. However, this change from Z or Z+ space to W+ space because it is generally irregular and cannot be directly sampled. To overcome this limitation, a distribution prior W of the W+ space is modeled by inverting a large dataset of real face images into W+ embeddings via the pre-trained image encoder, and then the latent codes from that distribution prior W are sampled.

A desired output stylization based on the normalized exemplar set 424 is not exactly aligned with the input images due to the normalization of expression, pose, and lighting. Therefore, commonly used perceptual loss cannot be applied directly in training the decoder 420. Instead, the loss function 430 is configured with a segmented color loss function. A full objective of the segmented color loss function includes three loss terms to fine-tune a generator $G\phi$. Let $G\phi_o$ and $G\phi_t$ be a model of the decoder 420 before and after fine-tuning. Generally, the decoder loss 430 is configured for a color matching loss at a semantic level. Specifically, a first face segmentation model (e.g., from BiSeNet) is pre-trained on real images and a second face segmentation model is separately pre-trained on stylized images to match the color of semantic regions. The semantic regions may be hair regions, skin regions, eye regions, eyebrow regions, nose regions, shape regions, or other suitable semantic regions. As an example, let S={hair, skin} be classes taken into consideration, and $B^k(I)$ ($k \in S$) be the mean color of pixels belonging to class k in image I. $B^k_{real}$ and $B^k_{style}$ represent real and stylized models, respectively. The semantic color matching loss $\mathscr{L}_{sem}$ $$\mathscr{L}_{sem} = \mathbb{E}_{w \sim \mathcal{W}} [\sum_{k \in S} (\|\mathcal{B}_{real}^k(\mathcal{G}_{\phi_o}(w)) - \mathcal{B}_{style}^k(\mathcal{G}_{\phi_t}(w))\|^2)],$$

An adversarial loss is used to match the distribution of the translated images to the target stylized set distribution Y, where D is the StyleGAN2 discriminator:

$$\mathscr{L}_{adv} = \mathbb{E}_{y \sim \mathcal{Y}} [\min(0, -1 + D(y))] + \mathbb{E}_{w \sim \mathcal{W}} [\min(0, -1 - D(\mathcal{G}_{\phi_t}(w)))],$$

Also, to improve training stability and prevent artifacts, an R1 regularization is used for a discriminator of the GAN 405 for the portrait stylization engine 112, where y may be set to 10 or another suitable value. Additionally, the generator 420 and encoder 410 are jointly trained to optimize the combined objective function.

$$\mathcal{L}_{stylize} = \lambda_{adv}\mathcal{L}_{adv} + \lambda_{sem}\mathcal{L}_{sem} + \lambda_{R1}\mathcal{L}_{R1}.$$

The weights $\lambda_{adv}=1$, $\lambda_{sem}=12$, $\lambda_{R1}=5$ may be provided as constant weights set empirically.

Figure 5:
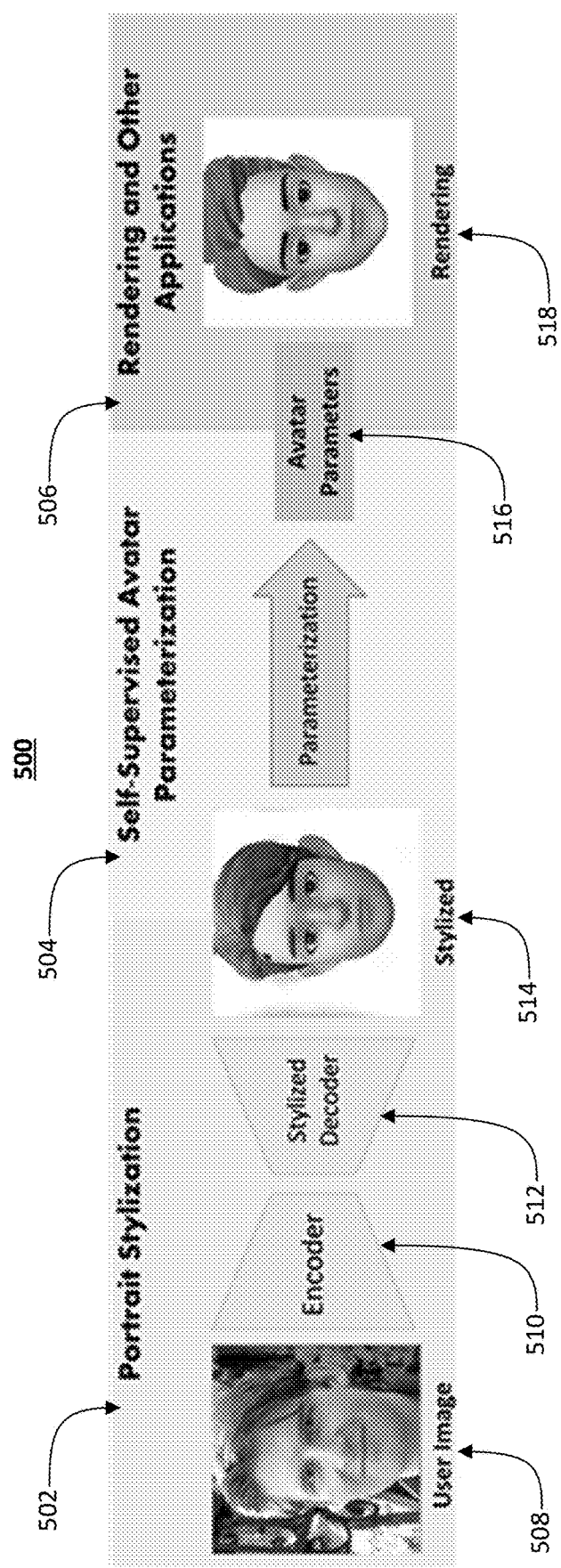
FIG. 5 illustrates an example dataflow process for generating a stylized 3D avatar, according to an example embodiment.

FIG. 5 illustrates an example dataflow process 500 for generating a stylized 3D avatar, according to some aspects described herein. The dataflow process 500 can be executed as a set of computer-executable instructions executed by a computer system and encoded or stored on a computer readable medium. In examples, aspects of the method 500 are performed by one or more processing devices, such as a computer or server. Further, the method 500 can be performed by gates or circuits associated with a processor, Application Specific Integrated Circuit (ASIC), a field programmable gate array (FPGA), a system on chip (SOC), a neural processing unit, or other hardware device.

The dataflow process 500 includes a portrait stylization component 502, a self-supervised avatar parameterization component 504, and a rendering and other applications component 506. At the portrait stylization component 502, a user image 508 is received by an encoder 510. The encoder 510 transfers data corresponding to the user image 508 to a stylized decoder 512. The stylized decoder 512 and the encoder 510, in combination, may form a generative adversarial network (GAN). The stylized decoder 512 outputs a stylized image 514.

The stylized image 514 is used by the self-supervised avatar parameterization component 504 to generate a plurality of avatar parameters 516. For example, the plurality of avatar parameters 516 may be regressed from the stylized image 514. The plurality of avatar parameters 516 may be regressed from the stylized image using a trained model, such as, for example, a neural network that is trained to identify features from a stylized image. The plurality of avatar parameters 516 may be used by the rendering component 506 to generate an avatar rendering 518.

The plurality of avatar parameters 516 may be used by a rendering engine to produces an avatar image corresponding to a stylized image as closely as possible (e.g., the avatar rendering 518). A mapper may be a mechanisms that finds each of the plurality of avatar parameters 516. To facilitate training the mapper, a differentiable neural rendering engine may be used. The differentiable neural rendering engine may be an imitator. A particular avatar (e.g., avatar rendering 518) may be defined by an avatar vector with both continuous and discrete parameters. Continuous parameters are used to control primarily placement and size, for example eye size, eye rotation, mouth position, and head width. Discrete parameters are used to set individual assets and textures such as hair types, beard types, and skin tone textures. All of the parameters may be concatenated into a vector with discrete parameters represented as one-hot vectors.

The mapper may take a result of a portrait stylization (e.g., the stylized image 514) as input, and output an avatar vector which defines a similar looking avatar (e.g., similar with respect to the stylized image 514). Rather than using the stylized image 514 itself as input, mechanisms provided herein may use a latent code w+ derived from the encoder 510, since it may be a more compact representation and/or contain facial semantic styles from coarse to fine.

The mapper may be built as a multi-layer perceptron (MLP), and trained using a loss or error function which measures the similarity between the stylized image, Istyle, and the imitator output, Iimitate. This loss function can contain several terms to measure the global and local similarity. To preserve global appearance, mechanisms described herein can incorporate identity loss Lid measuring the cosine similarity between two faces built upon a pretrained face recognition network. The Lid may be calculated using the following equation:

$$L_{id} = 1 - \cos(R(I_{style}), R(I_{imitate}))$$

For a more fine-grained similarity measurement, LPIPS loss may be incorporated in the loss function, as follows:

$$L_{lpips} = \|F(I_{style}) - F(I_{imitate})\|$$

F denotes the perceptual feature extractor. Additionally, mechanisms disclosed herein may use a color matching loss to obtain more faithful colors for the skin and hair region of a user, based on the following equation:

$$\mathcal{L}_{color} = \sum_{k \in \mathcal{S}} (\|\mathcal{B}_{style}^{k}(I_{style}) - \mathcal{B}_{style}^{k}(I_{imitate})\|^2)$$

The final loss function may be:

$$\mathcal{L}_{mapper} = \lambda_{id}\mathcal{L}_{id} + \lambda_{lpips}\mathcal{L}_{lpips} + \lambda_{color}\mathcal{L}_{color}.$$

In the above final loss function, $\lambda_{id}=0.4$, $\lambda_{lpips}=0.8$, and $\lambda_{color}=0.8$ may be set empirically to provide quality results.

As discussed herein an imitator may be a neural renderer trained to replicate the output of the graphics engine as closely as possible given an input avatar vector. The imitator has a property of differentiability, making it suitable for inclusion in an optimization framework. Mechanisms provided herein may include a neural model as a generator, which is capable of generating high quality avatar renderings. The neural model may be trained with synthetic avatar data, in a supervised manner.

Solving for discrete parameters can be challenging because of unstable convergence. Some methods handle the unstable convergence via quantization during optimization. However, some examples provided herein may be more effective by providing quantization after optimization, which relaxes discrete constraints during training and re-apply it as postprocessing. Mechanisms described herein for training discrete parameters in a mapper make use of an imitator's differentiable property. When mixing two avatar vectors, an imitator may produce a valid rendering. That is, given one-hot encodings $v_1$ and $v_2$ of two hair or beard types, their linear interpolation $v_{mix}=(1-\alpha)\cdot v_1 + \alpha \cdot v_2 (\alpha \in [0,1])$ produces a valid result.

Thus, when training a mapper according to mechanisms described herein, discrete parameters may not be strictly enforced, and instead a softmax function may be applied to the final activation of the mapper to allow a continuous optimization space while still discouraging mixtures of too many asset types.

Figure 6:
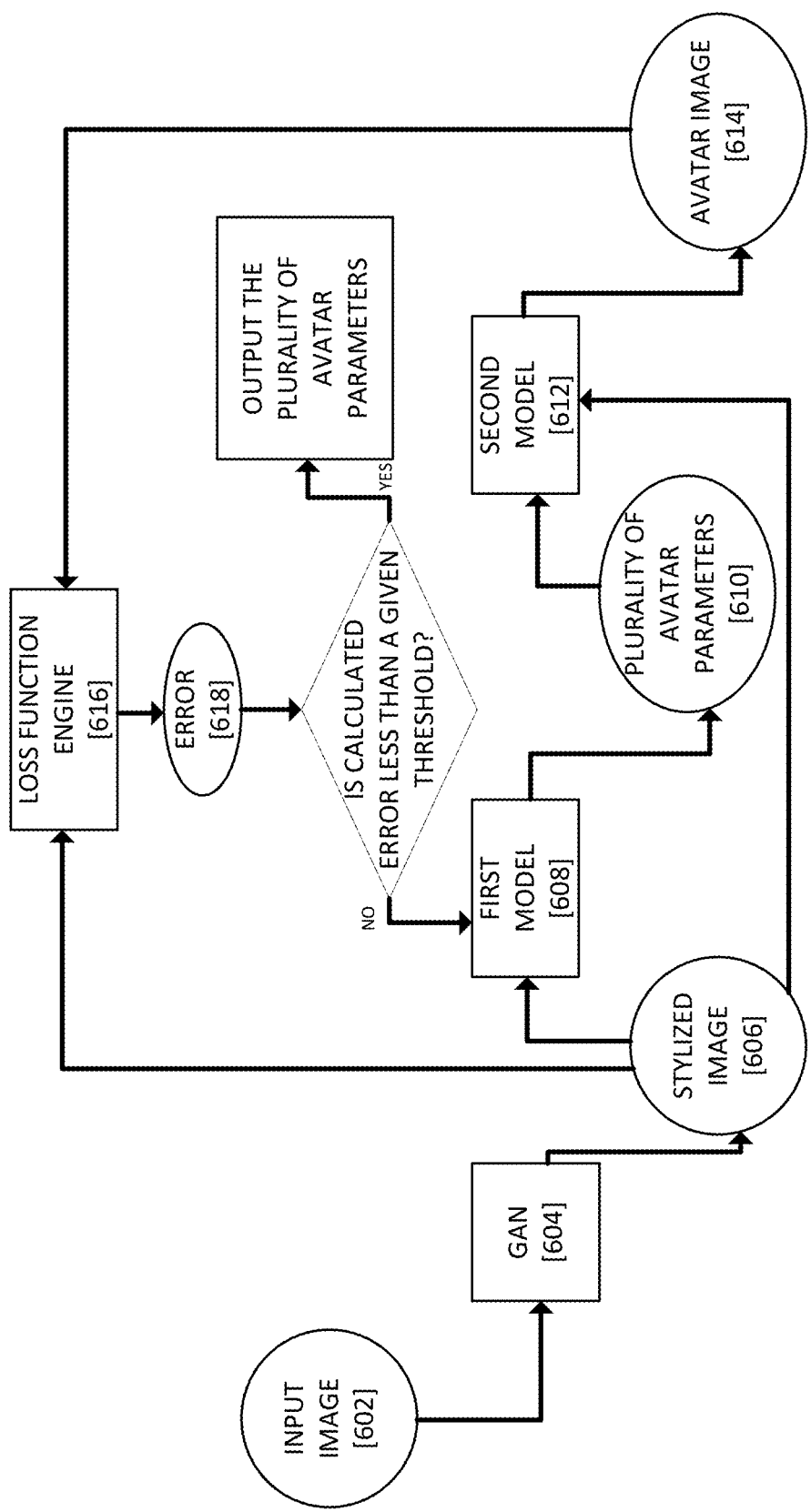
FIG. 6 illustrates an example dataflow process for generating a stylized 3D avatar, according to an example embodiment.

FIG. 6 illustrates an example dataflow process 600 for generating a stylized 3D avatar, according to some aspects described herein. The dataflow process 600 can be executed as a set of computer-executable instructions executed by a computer system and encoded or stored on a computer readable medium. In examples, aspects of the method 600 are performed by one or more processing devices, such as a computer or server. Further, the method 600 can be performed by gates or circuits associated with a processor, Application Specific Integrated Circuit (ASIC), a field programmable gate array (FPGA), a system on chip (SOC), a neural processing unit, or other hardware device.

As shown in FIG. 6, the dataflow process 600 begins when an input image 602 is input into a generative adversarial network (GAN) 604. The input image may correspond to a user (e.g., a user who takes a "selfie" image). Further, the GAN 604 may include an encoder and a decoder, such as the encoder 510 and the stylized decoder 512 described earlier herein with respect to FIG. 5. In some examples, the input image 602 may be received from a memory location that is local to a computing device executing one or more aspects of the dataflow process 600. In some examples, the input image 602 may be received from a memory location that is remote to a computing device executing one or more aspects of the dataflow process 600. The GAN generates a stylized image 606, based on the input image. Mechanisms for generating a stylized image, using a GAN, may be recognized by those of ordinary skill in the art, at least in light of the teachings described herein.

The stylized image 606 is provided to a first model 608. The first model 608 may be trained to regress, extract, or otherwise determine a plurality of avatar parameters, based on the stylized image. The plurality of avatar parameters may include one or more discrete parameters and/or one or more continuous parameters. For example, the continuous parameters may include head characteristics, mouth characteristics, nose characteristics, ear characteristics, and/or eye characteristics, which each correspond to the user of whom the input image corresponds. Further, the discrete parameters may include one or more from the group of: hair type, brow type, beard type, glasses type, eyelash type, eye makeup type, eye color type, brow color type, skin tone, hair color type, beard color type, mouth color type, and/or glasses color type.

In some examples, with respect to the continuous parameters, the head characteristics include a head width, a head length, and a blend shape coefficient for a head shape (e.g., a blend shape coefficient that corresponds to a circular head, an ovular head, etc.). In some examples, the mouth characteristics include a mouth width, a mouth volume, and a mouth position. In some examples, the nose characteristics include a nose width, a nose height, and a nose position. In some examples, the eye characteristics include an eye size, an eye spacing, and an eye rotation. Additionally, or alternatively, in some examples, the ear characteristics comprise an ear size. Each of the characteristics of the continuous parameters may include a continuous value.

In some examples, the discrete parameters include one or more from the group of: hair type, brow type, beard type, glasses type, eyelash type, eye makeup type, eye color type, brow color type, skin tone, hair color type, beard color type, mouth color type, and/or glasses color type. Each of the discrete parameters may have a discrete number of choices to which the respective discrete parameter correspond. For example, the eye color type may have associated discrete options such as: gray, green, hazel, blue and/or brown. As another example, glasses color type may include options such as: red, orange, yellow, green, blue, indigo, and/or violet. Additional and/or alternative discrete options which may correspond to each of the discrete parameters should be recognized by those of ordinary skill in the art.

The plurality of discrete parameters 610 and the stylized image 606 may then be input into, or otherwise received by, the second model 612. The second model 612 may be a trained model, such as a trained machine learning model, that is trained to generate an avatar image 614. The second model 612 may be trained based on a dataset of avatar parameters and stylized images, to generate corresponding avatar images. In the dataflow process 600, the avatar image 614 may be generated, by the second model 612, based on the plurality of avatar parameters 610 and the stylized image 606.

The avatar image 614 and the stylized image 606 may then be input into, or otherwise received by, a loss function engine or component 616. The loss function component 616 may compare the stylized image 606 to the avatar image 614 to determine an error 618. The error 618 may be based on a color loss, an identity loss, and/or a perception loss. The error 618 may be similar to the mapping error discussed earlier herein with respect to FIG. 5.

The color loss may correspond to a difference between the stylized image and the avatar image, with respect to the discrete parameters. For example, the color loss may correspond to a difference in eye color type, brow color type, skin tone, hair color type, beard color type, mouth color type, and/or glasses color type, between the stylized image and the avatar image.

The avatar image and the stylized image may each comprise a respective plurality of pixels. The identity loss may correspond to a difference in a global appearance between the avatar and stylized images (e.g., not based on specific pixel-to-pixel comparisons). On the other hand, the perception loss may correspond to a difference between each pixel of the plurality of pixels of the stylized image to each respective pixel of the plurality of pixels of the avatar image. In this respect, the perception loss may be a pixel-by-pixel or localized analysis to determine error between the stylized image 606 and the avatar image 614.

Based on the error 618, mechanisms disclosed herein may determine if the calculated error 618 is less than a given or predetermined error threshold. The predetermined error threshold may be configured by a user or by a developer of a product or process incorporating mechanisms described herein. If the calculated error 618 is less than the given threshold, then the plurality of avatar parameters 610 may be provided as an output. However, if the calculated error is not less than the given threshold, then mechanisms described herein may update the first model 608, based on the error 618, to generate an updated plurality of avatar parameters 610. The updated plurality of avatar parameters 610 may correspond to the original plurality of avatar parameters, in that the types of discrete parameters and/or continuous parameters may be the same; however, one or more values thereof may be modified, based on the error 618.

The updated plurality of avatar parameters 610 may then be used by the second model 612 to generate an updated avatar image 614. The updated avatar image 614 may be input into the loss function component 616, along with the stylized image 606, to generate an updated error 618. In some examples, the process 600 may repeat one or more aspects until the error 618 is below the given threshold, and the plurality of avatar parameters 610 (e.g., for a current iteration of the process 600) are output. Alternatively, in some examples, the process 600 may repeat one or more aspects for a predetermined number of times, and once the predetermined number of times is met or exceeded, the plurality of avatar parameters 610 (e.g., for a current iteration of the process 600) may be output, regardless of whether the error 618 is less than the given threshold.

The method 600 may be modified to include additional and/or alternative component, inputs, and/or outputs as will be recognized by those of ordinary skill in the art, for specific implementations.

Figure 7:
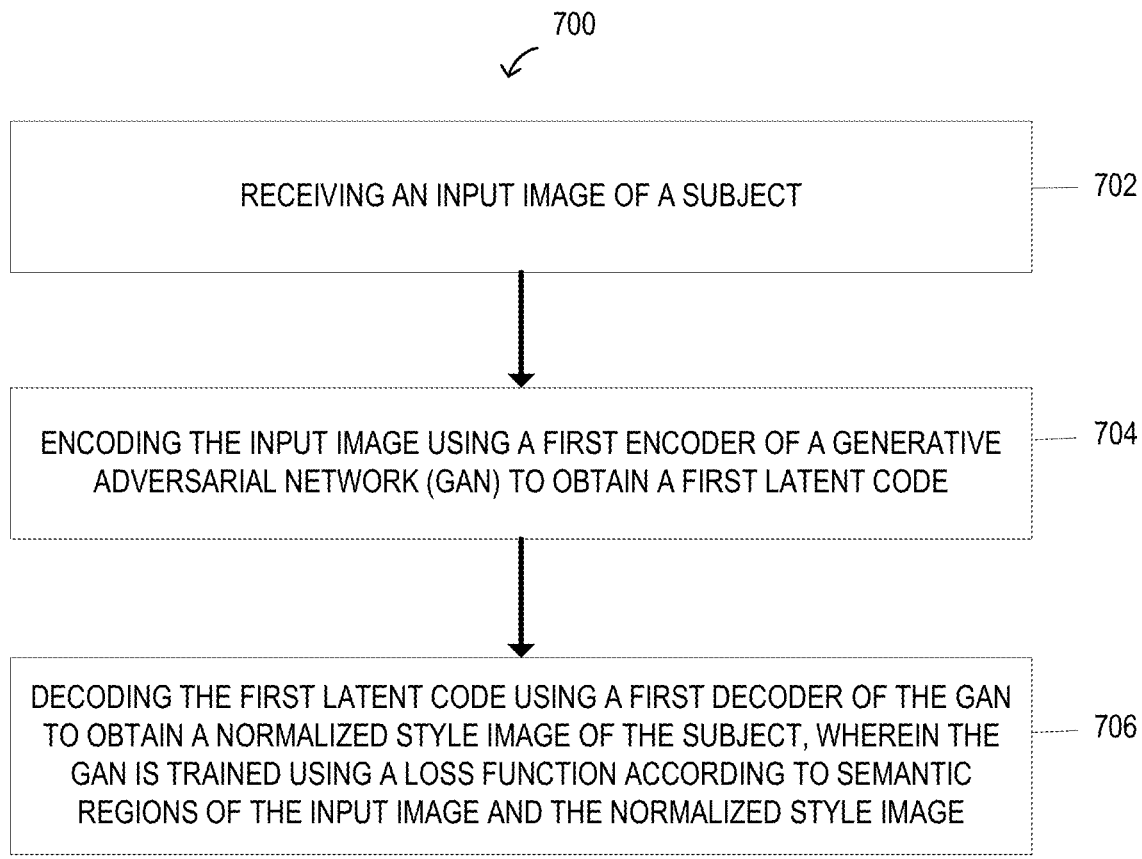
FIG. 7 shows a flowchart of an example method of generating a style image, according to an example embodiment.

FIG. 7 shows a flowchart of an example method 700 of generating a style image, according to an example embodiment. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 7. Steps may be performed serially, in a partially overlapping manner, or fully in parallel. Thus, the order in which steps of method 700 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 7 may be performed by the computing device 110 (e.g., via the portrait stylization engine 112), the portrait stylization engine 312, or other suitable computing device.

Method 700 begins with step 702. At step 702, an input image of a subject is received. The input image may correspond to the input image 402, in some examples, and may be a real image of the subject, such as a selfie image.

At step 704, the input image 402 is encoded using a first encoder of a generative adversarial network (GAN) to obtain a first latent code. In some examples, the GAN generally corresponds to the GAN 405 and the first encoder is the encoder 410. The first latent code may correspond to one of the plurality of latent codes 415, for example.

At step 706, the first latent code is decoded using a first decoder of the GAN to obtain a normalized style image of the subject, wherein the GAN is trained using a loss function according to semantic regions of the input image and the normalized style image. In an example, the first decoder generally corresponds to the decoder 420 and the normalized style image corresponds to the image 404, while the loss function corresponds to the decoder loss 430.

The method 700 may further comprise training the GAN by inverting a dataset of real face images to obtain a plurality of latent codes that model a distribution prior of a W+ space for the dataset. Inverting the dataset may include inverting the dataset of real face images using a second encoder that is pre-trained and different from the first decoder to obtain the plurality of latent codes. In some examples, the second encoder is a pre-trained StyleGAN encoder.

In some examples, training the GAN further comprises performing a W+ space transfer learning from the second encoder to the first encoder. In one example, performing the W+ space transfer learning comprises using a normalized exemplar set with only neutral expressions of the subject. In another example, performing the W+ space transfer learning comprises using a normalized exemplar set with only neutral poses of the subject. In yet another example, performing the W+ space transfer learning comprises using a normalized exemplar set with only neutral lighting of the subject.

The method 700 may further comprise training the GAN using a difference between a first face segmentation model trained using real face images and a second face segmentation model using style exemplars as the loss function. In some examples, the semantic regions include one or more of hair regions of the subject or skin regions of the subject.

Figure 8:
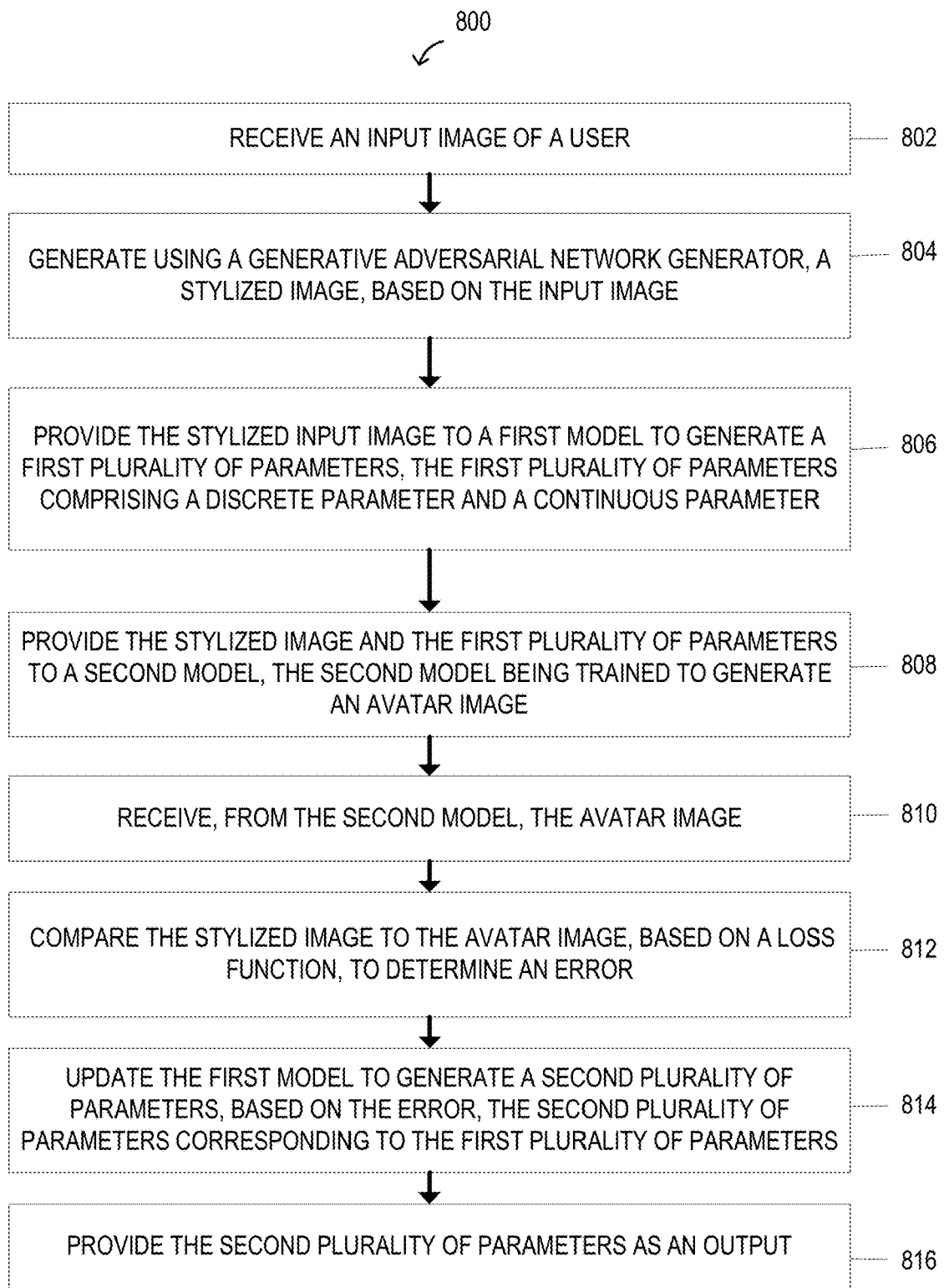
FIG. 8 shows a flowchart of another example method of generating a stylized 3D avatar, according to an example embodiment.

FIG. 8 shows a flowchart of an example method 800 of generating a stylized 3D avatar, according to an example embodiment. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 8. Steps may be performed serially, in a partially overlapping manner, or fully in parallel. Thus, the order in which steps of method 800 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 8 may be performed by the computing device 110 (e.g., via the avatar parameterization engine 114 and/or the avatar conversion engine 116), or other suitable computing device.

Method 800 begins with step 802. At step 602, an input image of a user is received. The input image may be a "selfie" image taken by a user of themselves. Alternatively, the input image may be an image taken of a user, by another person. In some examples, the input image may be received from a memory location that is local to a computing device executing one or more aspects of the method 800. In some examples, the input image may be received from a memory location that is remote to a computing device executing one or more aspects of the dataflow process 800.

At step 804, a stylized image is generated, based on the input image, and by using a generative adversarial network generator (GAN). The GAN may include an encoder and a decoder, such as the encoder 510 and the decoder 512 described earlier herein with respect to FIG. 5.

At step 806, the stylized input image is provided to a first model to generate a first plurality of parameters. In some examples, the first plurality of parameters include a discrete parameter and a continuous parameter. The first model may be trained to regress, extract, or otherwise determine a plurality of avatar parameters, based on the stylized image.

The plurality of avatar parameters may include one or more discrete parameters and/or one or more continuous parameters. In some examples, a plurality of continuous parameters may be directly generated by the first model, and a plurality of discrete parameters may be indirectly generated by the first model, based on the plurality of continuous parameters, as discussed earlier herein, such as with respect to FIG. 5.

The continuous parameters may include head characteristics, mouth characteristics, nose characteristics, ear characteristics, and/or eye characteristics, which each correspond to the user of whom the input image corresponds. Further, the discrete parameters may include one or more from the group of: hair type, brow type, beard type, glasses type, eyelash type, eye makeup type, eye color type, brow color type, skin tone, hair color type, beard color type, mouth color type, and/or glasses color type.

In some examples, with respect to the continuous parameters, the head characteristics include a head width, a head length, and a blend shape coefficient for a head shape (e.g., a blend shape coefficient that corresponds to a circular head, an ovular head, etc.). In some examples, the mouth characteristics include a mouth width, a mouth volume, and a mouth position. In some examples, the nose characteristics include a nose width, a nose height, and a nose position. In some examples, the eye characteristics include an eye size, an eye spacing, and an eye rotation. Additionally, or alternatively, in some examples, the ear characteristics comprise an ear size. Each of the characteristics of the continuous parameters may include a continuous value.

In some examples, the discrete parameters include one or more from the group of: hair type, brow type, beard type, glasses type, eyelash type, eye makeup type, eye color type, brow color type, skin tone, hair color type, beard color type, mouth color type, and/or glasses color type. Each of the discrete parameters may have a discrete number of choices to which the respective discrete parameter correspond. For example, the eye color type may have associated discrete options such as: gray, green, hazel, blue and/or brown. As another example, glasses color type may include options such as: red, orange, yellow, green, blue, indigo, and/or violet. Additional and/or alternative discrete options which may correspond to each of the discrete parameters should be recognized by those of ordinary skill in the art.

At step 808, the stylized image and the first plurality of parameters are provided to a second model. The second model is trained to generate an avatar image. The second model may be a trained model, such as a trained machine learning model, that is trained to generate an avatar image. The second model may be trained based on a dataset of avatar parameters and stylized images, to generate corresponding avatar images.

At step 810, the avatar image is received from the second model. In some examples, the avatar image may be output from the second model.

At step 812, the stylized image is compared to the avatar image, based on a loss function, to determine an error. The error may be based on a color loss, an identity loss, and/or a perception loss.

The color loss may correspond to a difference between the stylized image and the avatar image, with respect to the discrete parameters. For example, the color loss may correspond to a difference in eye color type, brow color type, skin tone, hair color type, beard color type, mouth color type, and/or glasses color type, between the stylized image and the avatar image.

The avatar image and the stylized image may each comprise a respective plurality of pixels. The identity loss may correspond to a difference in a global appearance between the avatar and stylized images (e.g., not based on specific pixel-to-pixel comparisons). On the other hand, the perception loss may correspond to a difference between each pixel of the plurality of pixels of the stylized image to each respective pixel of the plurality of pixels of the avatar image. In this respect, the perception loss may be a pixel-by-pixel and/or localized analysis to determine error between the stylized image and the avatar image.

Based on the error, mechanisms disclosed herein may determine if the calculated error is less than a given or predetermined error threshold. The predetermined error threshold may be configured by a user or by a developer of a product or process incorporating mechanisms described herein. If the calculated error is less than the given threshold, then the plurality of avatar parameters may be provided as an output. However, if the calculated error is not less than the given threshold, then mechanisms described herein may update the first model, based on the error, to generate an updated plurality of avatar parameters.

At step 814, the first model is updated to generate a second plurality of parameters, based on the error. The second plurality of parameters correspond to the first plurality of parameters. The second plurality of avatar parameters may be used by the second model to generate an updated avatar image. The updated avatar image may be input into the loss function component, along with the stylized image, to generate an updated error. In some examples, the process method 800 may repeat one or more steps until the error is below the given threshold, and the plurality of avatar parameters (e.g., for a current iteration of the method 800) are output. Alternatively, in some examples, the method 800 may repeat one or more aspects for a predetermined number of times, and once the predetermined number of times is met or exceeded, the plurality of avatar parameters (e.g., for a current iteration of the method 800) may be output, regardless of whether the error is less than the given threshold.

At step 816, the second plurality of parameters are provided as an output. Generally, method 800 may be useful for determining ideal parameters for generating an avatar image that is of high quality (e.g., similarity of features) to a stylized image. The second plurality of parameters (e.g., parameters that have been improved from a first plurality of parameters, based on an error calculation) may be stored or otherwise used for further processing related to generating high-quality avatar images.

Figure 9:
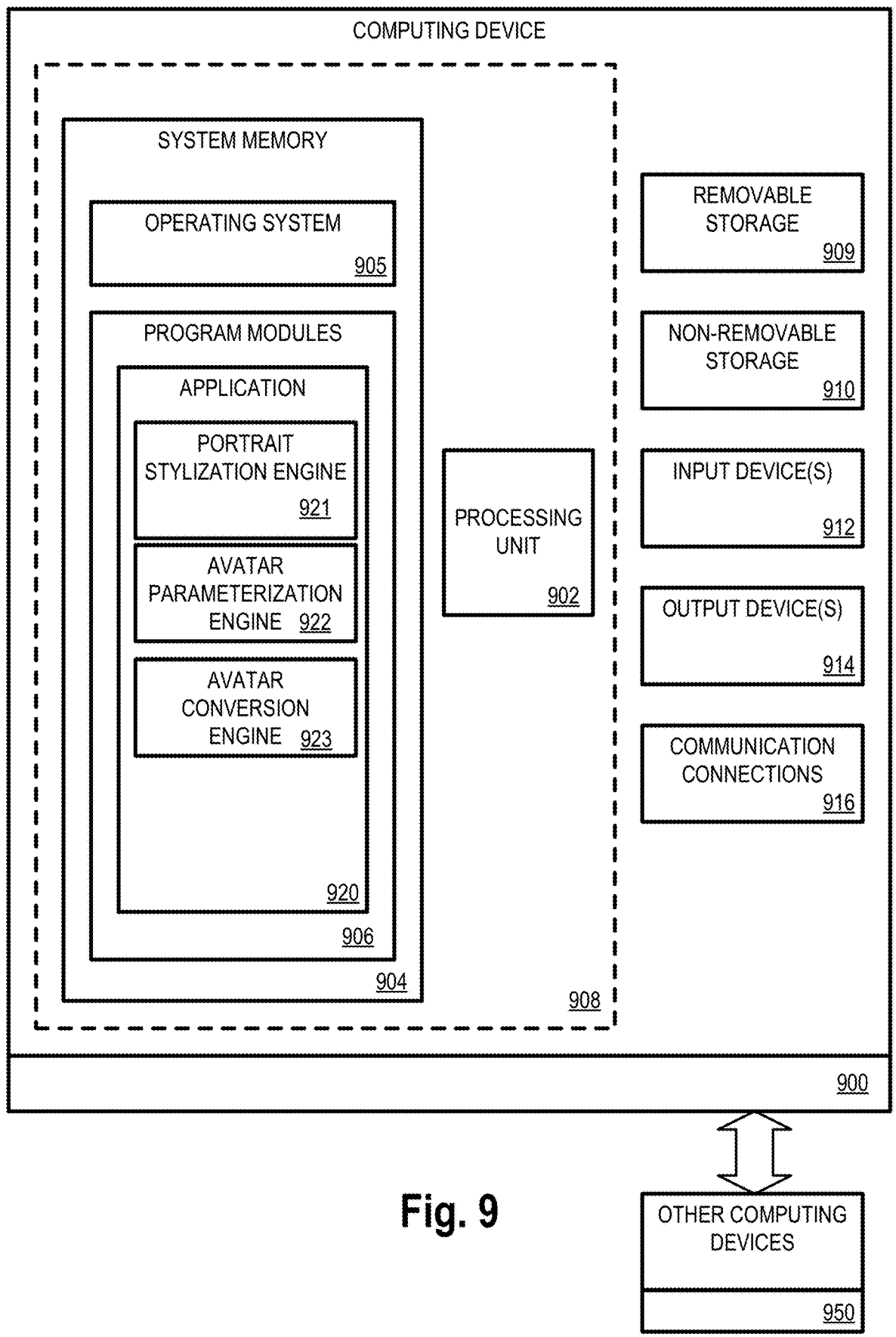
FIG. 9 is a block diagram illustrating example physical components of a computing device with which aspects of the disclosure may be practiced.
Figure 10:
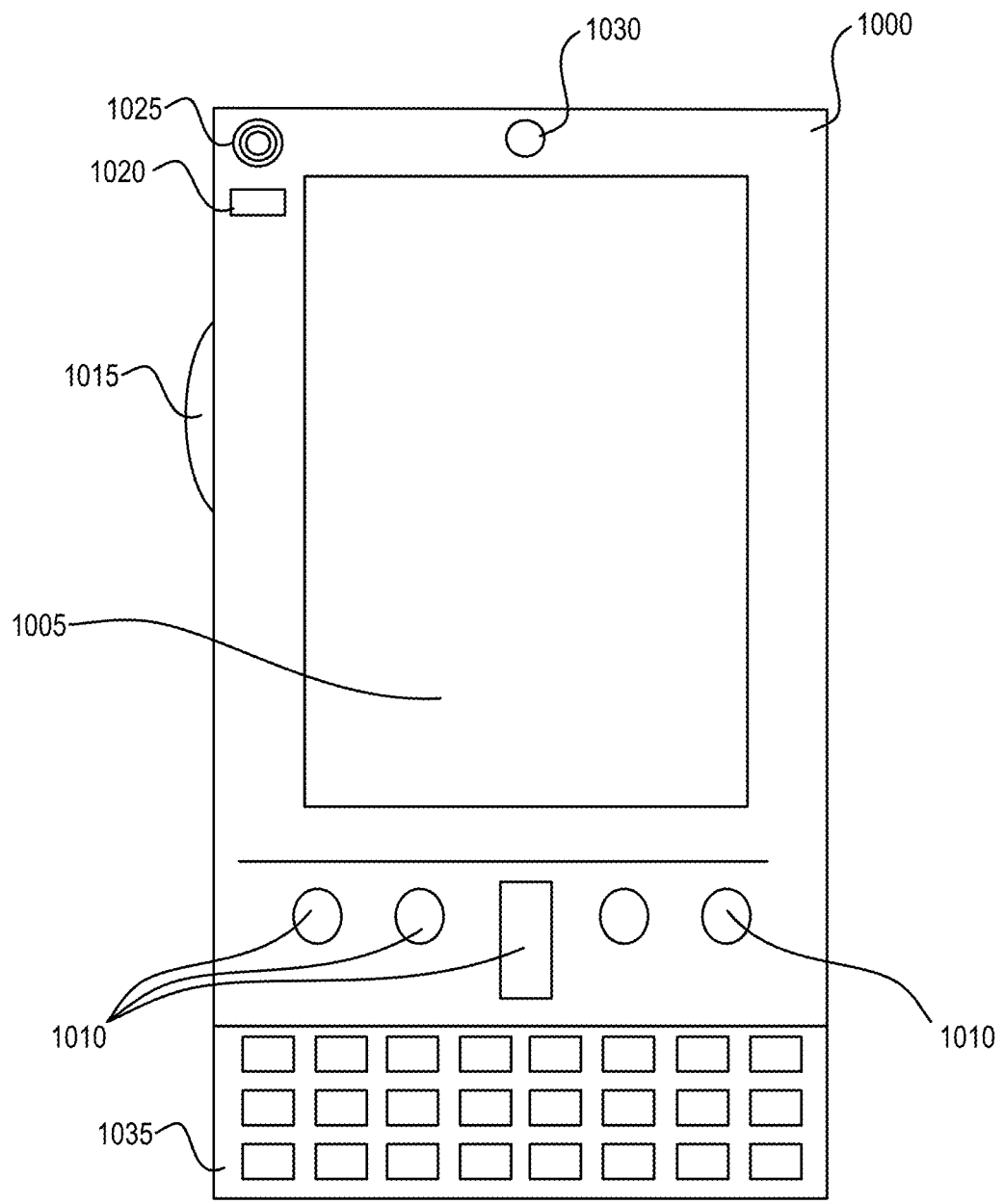
FIGS. 10 and 11 are simplified block diagrams of a mobile computing device with which aspects of the present disclosure may be practiced.
Figure 11:
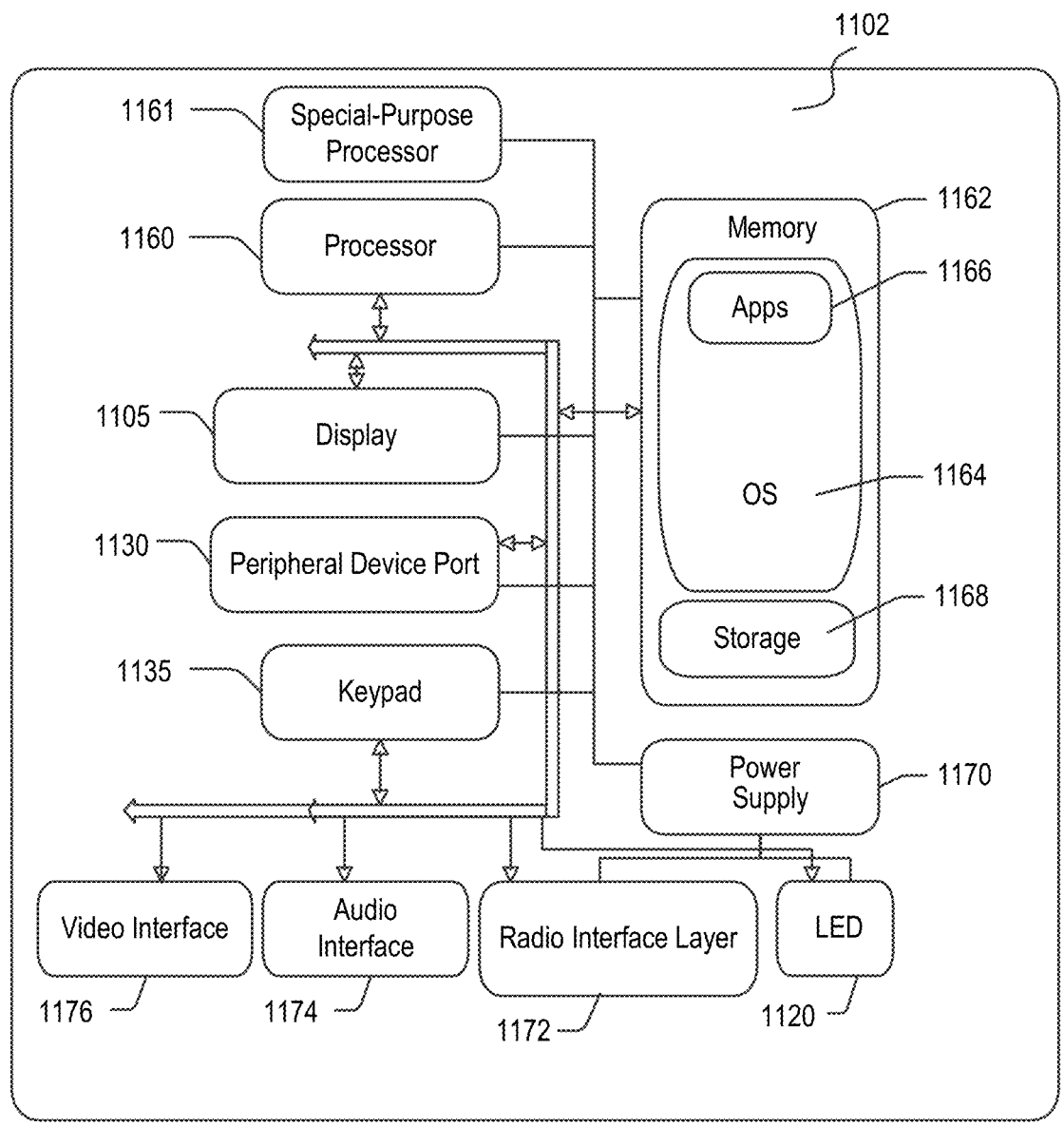

FIGS. 9, 10, and 11 and the associated descriptions provide a discussion of a variety of operating environments in which aspects of the disclosure may be practiced. However, the devices and systems illustrated and discussed with respect to FIGS. 9, 10, and 11 are for purposes of example and illustration and are not limiting of a vast number of computing device configurations that may be utilized for practicing aspects of the disclosure, as described herein.

FIG. 9 is a block diagram illustrating physical components (e.g., hardware) of a computing device 900 with which aspects of the disclosure may be practiced. The computing device components described below may have computer executable instructions for implementing an image generation application 920 on a computing device (e.g., computing device 110, computing device 120), including computer executable instructions for image generation application 920 that can be executed to implement the methods disclosed herein. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories. The system memory 904 may include an operating system 905 and one or more program modules 906 suitable for running image generation application 920, such as one or more components with regard to FIGS. 1, 3, 4, and 6 and, in particular, portrait stylization engine or component 921 (e.g., corresponding to portrait stylization engine or component 112), avatar parameterization engine or component 922 (e.g., corresponding to avatar parameterization engine or component 114), and avatar conversion engine 923 (e.g., corresponding to avatar conversion engine or component 116).

The operating system 905, for example, may be suitable for controlling the operation of the computing device 900. Furthermore, embodiments of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 (e.g., image generation application 920) may perform processes including, but not limited to, the aspects, as described herein. Other program modules that may be used in accordance with aspects of the present disclosure, and in particular for generating images, may include portrait stylization engine or component 921, avatar parameterization engine or component 922, and avatar conversion engine or component 923.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 900 may also have one or more input device(s) 912 such as a keyboard, a mouse, a pen, a sound or voice input device, a touch or swipe input device, etc. The output device(s) 914 such as a display, speakers, a printer, etc. may also be included. The aforementioned devices are examples and others may be used. The computing device 900 may include one or more communication connections 916 allowing communications with other computing devices 950. Examples of suitable communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 10 and 11 illustrate a mobile computing device 1000, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 10, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display). If included, an optional side input element 1015 allows further user input. The side input element 1015 may be a rotary switch, a button, or any other type of manual input element. In alternative aspects, mobile computing device 1000 may incorporate more or less input elements. For example, the display 1005 may not be a touch screen in some embodiments. In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display. In various embodiments, the output elements include the display 1005 for showing a graphical user interface (GUI), a visual indicator 1020 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 11 is a block diagram illustrating the architecture of one aspect of a mobile computing device. That is, the mobile computing device 1000 can incorporate a system (e.g., an architecture) 1102 to implement some aspects. In one embodiment, the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as email or other messages used by an email application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer.

The system 1102 has a power supply 1170, which may be implemented as one or more batteries. The power supply 1170 may further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1120 may be used to provide visual notifications, and/or an audio interface 1174 may be used for producing audible notifications via an audio transducer (e.g., audio transducer 1025 illustrated in FIG. 10). In the illustrated embodiment, the visual indicator 1120 is a light emitting diode (LED) and the audio transducer 1025 may be a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1025, the audio interface 1174 may also be coupled to a microphone to receive audible input, such as to facilitate a telephone conversation. In accordance with embodiments of the present disclosure, the microphone may also serve as an audio sensor to facilitate control of notifications, as will be described below. The system 1102 may further include a video interface 1176 that enables an operation of peripheral device 1130 (e.g., on-board camera) to record still images, video stream, and the like.

A mobile computing device 1000 implementing the system 1102 may have additional features or functionality. For example, the mobile computing device 1000 may also include additional data storage devices (removable and/or non-removable) such as, magnetic disks, optical disks, or tape. Such additional storage is illustrated in FIG. 11 by the non-volatile storage area 1168.

Data/information generated or captured by the mobile computing device 1000 and stored via the system 1102 may be stored locally on the mobile computing device 1000, as described above, or the data may be stored on any number of storage media that may be accessed by the device via the radio interface layer 1172 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio interface layer 1172 or via a distributed computing network. Similarly, such data/information may be readily transferred between computing devices for storage and use according to well-known data/information transfer and storage means, including electronic mail and collaborative data/information sharing systems.

As should be appreciated, FIGS. 10 and 11 are described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method of generating a style image, the method comprising:
   receiving an input image of a subject;
   encoding the input image using a first encoder of a generative adversarial network (GAN) to obtain a first latent code;
   decoding the first latent code using a first decoder of the GAN to obtain a normalized style image of the subject, wherein:
   the GAN is trained using a loss function according to semantic regions of the input image and the normalized style image, and
   a distribution prior of a W+ space is modeled for training the GAN by inverting a dataset of real face images using a second encoder that is pre-trained.

2. The method of claim 1, further comprising training the GAN by inverting the dataset of real face images to obtain a plurality of latent codes.

3. The method of claim 1, the second encoder is different from the first decoder.

4. The method of claim 1, wherein the second encoder is a pre-trained StyleGAN encoder.

5. The method of claim 1, wherein training the GAN further comprises performing a W+ space transfer learning from the second encoder to the first encoder.

6. The method of claim 5, wherein performing the W+ space transfer learning comprises using a normalized exemplar set with only neutral expressions of the subject.

7. The method of claim 5, wherein performing the W+ space transfer learning comprises using a normalized exemplar set with only neutral poses of the subject.

8. The method of claim 5, wherein performing the W+ space transfer learning comprises using a normalized exemplar set with only neutral lighting of the subject.

9. The method of claim 1, further comprising training the GAN using a difference between a first face segmentation model trained using real face images and a second face segmentation model using style exemplars as the loss function.

10. The method of claim 9, wherein the semantic regions include one or more of hair regions of the subject or skin regions of the subject.

11. A system for generating a style image, the system comprising:
a processor; and
memory storing instructions that, when executed by the processor, cause the system to perform a set of operations, the set of operations comprising:
receiving an input image of a subject;
encoding the input image using a first encoder of a generative adversarial network (GAN) to obtain a first latent code;
decoding the first latent code using a first decoder of the GAN to obtain a normalized style image of the subject, wherein:
the GAN is trained using a loss function according to semantic regions of the input image and the normalized style image, and
a distribution prior of a W+ space is modeled for training the GAN by inverting a dataset of real face images using a second encoder that is pre-trained.

12. The method of claim 11, wherein the set of operations further comprise training the GAN by inverting the dataset of real face images to obtain a plurality of latent codes.

13. The method of claim 11, wherein the second encoder is different from the first decoder.

14. The method of claim 11, wherein the second encoder is a pre-trained StyleGAN encoder.

15. The method of claim 11, wherein the set of operations further comprise performing a W+ space transfer learning from the second encoder to the first encoder.

16. The method of claim 15, wherein the set of operations further comprise using a normalized exemplar set with only neutral expressions of the subject.

17. The method of claim 15, wherein the set of operations further comprise using a normalized exemplar set with only neutral poses of the subject.

18. The method of claim 15, wherein the set of operations further comprise using a normalized exemplar set with only neutral lighting of the subject.

19. The method of claim 11, wherein the set of operations further comprise training the GAN using a difference between a first face segmentation model trained using real face images and a second face segmentation model using style exemplars as the loss function.

20. The method of claim 19, wherein the semantic regions include one or more of hair regions of the subject or skin regions of the subject.

* * * * *